United States Patent [19]

Morrell

[11] 4,142,318
[45] Mar. 6, 1979

[54] FISHING LURE

[76] Inventor: Francis E. Morrell, 4350 Percheron La., Arcata, Calif. 95521

[21] Appl. No.: 798,338

[22] Filed: May 19, 1977

[51] Int. Cl.² ............................................. A01K 85/04
[52] U.S. Cl. .................................... 43/42.23; 43/42.5
[58] Field of Search ................. 43/42.23, 42.5, 42.51, 43/42.2, 42.52; D22/27, 28, 29

[56] References Cited

U.S. PATENT DOCUMENTS

| D. 237,177 | 10/1975 | Morrell | D22/29 |
| 1,224,074 | 4/1917 | Couper | 43/42.51 |
| 2,680,926 | 6/1954 | Janis | D22/29 X |
| 3,056,228 | 10/1962 | Stackhouse | 43/42.51 |
| 3,432,957 | 3/1969 | Marino | 43/42.51 X |

FOREIGN PATENT DOCUMENTS 672568 10/1963 Canada ..................... 43/42.23

Primary Examiner—Nicholas P. Godici
Attorney, Agent, or Firm—Warren, Chickering & Grunewald

[57] ABSTRACT

A fishing lure adapted for trolling in waters being fished and comprising an elongated section of concavo-convex curvature in a longitudinal plane and having laterally extending flute sections of concavo-convex curvature in transverse planes generally perpendicular to the longitudinal plane of the lure and having line- and hook-fastening openings positioned to provide optional spinning or wobbler action of the lure in the water.

5 Claims, 5 Drawing Figures

U.S. Patent    Mar. 6, 1979    4,142,318
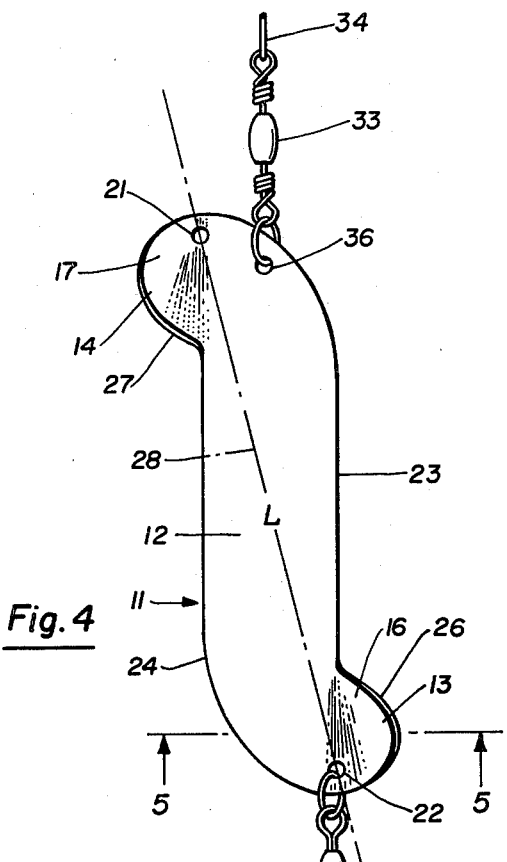
Fig. 4
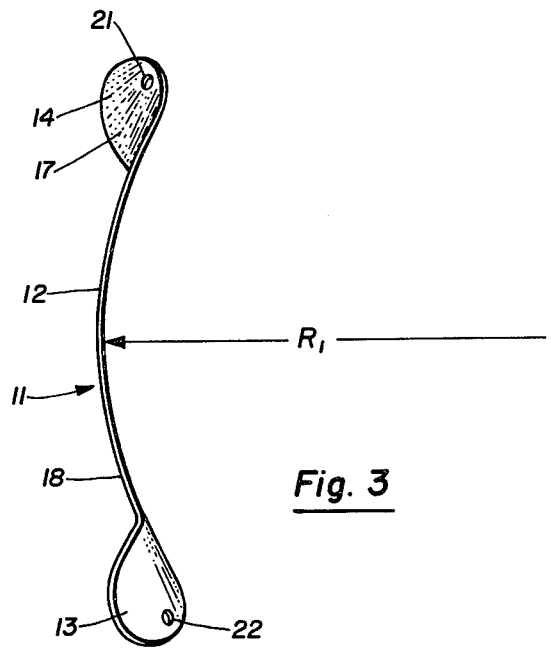
Fig. 3
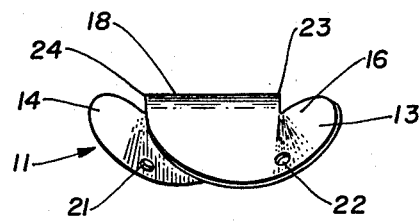
Fig. 2
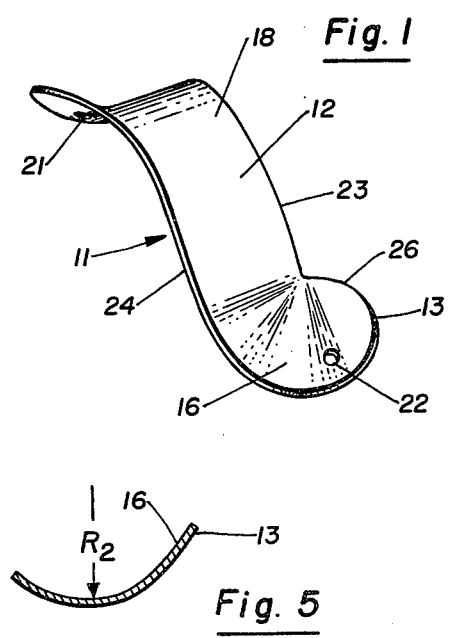
Fig. 1
Fig. 5

FISHING LURE

BACKGROUND OF THE INVENTION

The invention relates to metal fishing lures used by fishermen in trolling for fish, see for example, my Design Patent D237,177, and the following prior art developed in a search: U.S. Pat. No. 1,115,743; 1,471,280; 1,831,267; 2,608,788; 3,418,744; and 3,497,986. These prior fishing lures are of a nature only generally similar to that herein shown, lacking specific features referred to in the Abstract and hereinafter further described and claimed.

SUMMARY OF THE INVENTION

The fishing lure of the present invention, due to its shape and proportions, will provide unique and improved fish-attracting power and improved fish-striking ability.

Another feature of the present invention is to provide a fishing lure which may be readily reproduced in a wide range of sizes useful in fishing for different types and sizes of fish and for use under varying fishing conditions.

A further feature of the present invention is its ability, at least in certain sizes, to function well and provide its improved fish-attracting power with either single or multiple hooks attached thereto.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

BRIEF DESCRIPTION OF THE DRAWING

FIG. 1 is a perspective view of a fishing lure constructed in accordance with the present invention.

FIG. 2 is an end view of the lure.

FIG. 3 is a side elevation of the lure.

FIG. 4 is a front elevation of the lure.

FIG. 5 is a cross-sectional view of the lure taken substantially on the plane of line 5—5 of FIG. 4.

DETAILED DESCRIPTION OF THE INVENTION

The fishing lure of the present invention comprises, briefly, a one-piece member 11 having an elongated center section 12 which is concavo-convex in a longitudinal plane, as seen in FIG. 3, and is formed with laterally extending end sections 13 and 14, which project to opposite sides of the member, as best seen in FIGS. 2 and 4; and sections 13 and 14 being concavo-convex in transverse planes, see FIGS. 2 and 5, perpendicular to the longitudinal plane of the device and with the concave sides 16 and 17 of the end sections coinciding with the convex side 18 of center section 12; and line- and hook-fastening means 21 and 22 provided at end sections 13 and 14.

Preferably, center section 12 is formed with substantially parallel longitudinally extending sides 23 and 24 and the member is formed with one end section 13-14 projecting laterally from one of sides 23-24 and the other end section projecting laterally from the other of the longitudinally extending sides. In the present instance, note end section 13 projecting laterally as a flute from side 23 and end section 14 projecting laterally as a second flute from the opposite longitudinal side 24. Also, it will be observed that each of the end sections is of rounded form, providing a continuous curve merging smoothly and tangentially into one of the sides, as for example, the merging of the back end of flute 13 into side 24 and, similarly, the merging of back end of flute 14 into side 23. At leading edges 26 and 27, flutes 13 and 14 break sharply away from sides 23 and 24 at somewhat greater than a right angle. For example, the rounded leading edge 26 of flute 13 leads into side 23 with some forward slope, that is, sloping toward the adjacent end of the device, and the leading edge 27 of flute 14 is similarly contoured.

As a feature of the present construction, linefastening means 21 is substantially aligned with longitudinal side 24 and hook-fastening means 22 is substantially aligned with longitudinally extending side 23. In the present instance, both fastening means 21 and 22 may comprise simple openings, as illustrated, adjacent the opposite ends of the device. These openings are located in the trough of the concave sides 16 and 17 of the flutes, as seen in FIG. 4, and a line L extending through openings 21 and 22 defines a spin axis 28 of the device. Thus, with the line connected at opening 21 and the hook connected at opening 22, the lure will provide a spinning action when trolled in the water. Minor variations in the size and curvature of the elements will affect the rate and arc of the spinning action. In the larger sizes, the lure will substitute for conventional metal plate flashers and, in such instances, hook 31 will be connected to opening 22 by a suitable length of leader. In the smaller sizes, hook 31 may be attached directly to the lure, preferably by a conventional swivel fastener 32. The usual line swivel fastener 33 is here shown for attaching line 34. Generally, a slower spin will improve the reflective power of the lure in the water to better simulate a young silver or steelhead or other small fingerling, depending on the size of the lure. It is further speculated that the flutes of the present lure create a sonic effect in the water that is detected by the fish and which will attract the fish to and cause them to strike the lure.

As another feature of the present invention, an alternate rigging of line 34 is provided to afford an important optional movement of the lure, viz., one best described as a wobbler action, an oscillatory movement, simulating the movement of a crippled fish in the water. As here shown, this alternate connection of fishing line 34 is provided by a second opening 36 in end section 14 spaced laterally from opening 21, thus locating opening 36 in a transverse position generally between longitudinal projections of sides 23 and 24. Fishing line 34 is illustrated in FIG. 4 connected to alternate opening 36 to provide the above-described wobbler action. The lure also functions well as a jig, typically letting the lure drop, say, 3 feet to 10 feet and then pulling it up at various speeds to provide a darting, erratic motion characteristic of a jig.

The lure may be fabricated as a single piece of stamped metal, such as steel, brass, phosphor bronze, copper or the like, in various metal gauges from about 16 to 22, and may be plated or otherwise coated to provide a bright, light-reflective surface. The heavier metal works the fishing line at a greater depth, thus minimizing or eliminating the use of weights. Different colors may also be advantageously used for attracting different species. The design, as illustrated and described, may be made in a full range of sizes from about 1 inch in length to 13 inches or more for sport and commercial fishing, the lure being adapted for trolling in the customary range of about 3 to 5 miles an hour. Good lure action may be obtained, as hereinabove described, by proportioning the length of the lure in its longitudinal plane as being at least equal to the radius of curvature $R_1$ of the longitudinal center section, see FIG. 3. Preferably, the length L along the spin axis of the lure will be in the range of about 1–2 times the radius of curvature $R_1$. Also, the radius of curvature of the center section, $R_1$, is greater than the radius of curvature $R_2$ of the end sections, see FIG. 5. Preferably, $R_1$ will exceed $R_2$ by a range of about 3–6 times. These radii of curvature produce the desired action of the lures in the water, depending upon the gauge of the metal, the velocity of the stream in which the lure is used, and the speed that it may be towed through the water. In practically all instances, the lure will function as described when fitted with either a single or a multiple group of hooks.

What is claimed is:

1. A fishing lure comprising:
   an elongated plate-like member of uniform thickness having substantially parallel sides and being curved about a transversely extending axis to provide a surface of revolution about said axis, said surface being substantially flat transversely of said member and substantially parallel to said axis and providing a concavo-convex form in a longitudinal center plane of said member perpendicular to said axis;
   one end of said member being formed with a portion extending laterally from one of said sides, the other end of said member being formed with a portion extending laterally from the other of said sides, said portions being similarly turned up from the convex side of said member to provide with said ends concavo-convex forms in transverse planes perpendicular to said longitudinal plane, said ends providing convex surfaces in said longitudinal planes and said surfaces and adjacent portions forming concavities in said transverse plane; and
   line-and-hook fastening means provided at said ends establishing a line of pull substantially subtending the concave side of said member between said ends in said longitudinal plane.

2. The lure defined in claim 1, said line of pull being inclined to and traversing a longitudinal center line medially of said sides;
   said portions extending to opposite sides of said line of pull; and
   one of said ends having a rounded distal edge providing a smooth continuous curve merging into one of said sides, and the other of said ends having a rounded distal edge providing a smooth continuous curve merging into the other of said sides.

3. The lure defined in claim 1, wherein the ratio of the length of said member to its radius of curvature in said longitudinal plane is in the range of about 1 to 2.

4. The lure of claim 3, wherein said radius of curvature of said center section is greater than the radius of curvature of said end sections.

5. The lure of claim 4, wherein said radius of curvature of said center section is in the range of about 3–6 times larger than said radius of curvature of said end sections.

* * * * *